United States Patent [19]

Sqourakes

[11] 4,220,046
[45] Sep. 2, 1980

[54] FLOWMETERING APPARATUS

[75] Inventor: George E. Sqourakes, Millis, Mass.

[73] Assignee: The Foxboro Company, Foxboro, Mass.

[21] Appl. No.: 971,608

[22] Filed: Dec. 20, 1978

[51] Int. Cl.³ .............................................. G01F 1/32
[52] U.S. Cl. ................................................ 73/861.22
[58] Field of Search ........................... 73/194 VS, 212; 29/137 R; 228/173 F

[56] References Cited

U.S. PATENT DOCUMENTS

| | | | |
|---|---|---|---|
| 1,329,040 | 1/1920 | Davis . | |
| 3,116,639 | 1/1964 | Bird | 73/194 |
| 3,585,859 | 6/1971 | De Leo | 73/212 |
| 3,823,610 | 7/1974 | Fussel, Jr. | 73/194 |

FOREIGN PATENT DOCUMENTS 132866  7/1977  Japan ......................... 73/194

Primary Examiner—Herbert Goldstein

Attorney, Agent, or Firm—Lawrence J. Dion, Jr.; Andrew T. Karnakis

[57] ABSTRACT

A flowmeter for use in sanitary applications where the flowmeter possesses a member that intrudes into the process fluid. The flowmeter includes a round pipe and a flow obstruction element that is uniquely secured in the pipe wall section. A co-planar section having an aperture is formed in the pipe wall. The flow obstruction element which has an enlarged head at one end is inserted through the aperture into the interior of the pipe. The enlarged head has a flat outer surface and a flow contact surface that is flat in the section adjacent its perimeter. The head is positioned so that the section of its flow contact surface adjacent its flow contact surface perimeter is co-planar with the inner surface of the co-planar pipe wall section. The side surface of the head is bonded to the side surface circumscribing the aperture in the co-planar pipe wall section. The flow contact surfaces of the flow obstruction element and the inner surface of the pipe wall are of low fluid collectability thereby preventing entrapment of process fluids.

8 Claims, 4 Drawing Figures

FLOWMETERING APPARATUS

FIELD OF THE INVENTION

This invention generally relates to flowmeters. More particularly this invention relates to flowmeters of the flow obstruction type which are particularly suitable for use in sanitary applications, and to improvements in the construction thereof.

BACKGROUND OF THE INVENTION

Flowmeters for use in sanitary applications have been devised. One possible approach for sanitary applications is to use obstructionless flowmeters; e.g., a magnetic flowmeter. A more difficult problem exists when obstruction type flowmeters are employed as for example, flowmeters of the vortex-shedding type.

Such flowmeters that possess a member that intrudes into the process fluid must meet rigid requirements for preventing entrapment of process fluids. The most common standards today require all flow contact surfaces to be at least as smooth as a No. 4 mill finish on stainless steel sheets and to be equally as corrosion resistant as stainless steel of the AISI 300 series so that the aforementioned smoothness will be maintained. Furthermore, all inside angles on the flow contact surfaces are to be greater than 135° or to be filleted with a radius of curvature of at least 0.25 inches and all bonded joints in flow contact surfaces are to present surfaces as smooth as those of the adjoining surfaces.

To meet these rigid requirements for sanitary applications, standard manufacturing techniques often result in extensive handworking. Therefore, the need exists for an obstruction type flowmeter for sanitary applications that is easy to build and inexpensive.

SUMMARY OF THE INVENTION

In a preferred embodiment of the present invention, a vortex-shedding type of flowmeter for use in sanitary applications having flow contact surfaces of low fluid collectibility to ensure no entrapment of process fluid that is easier and less expensive to construct is disclosed.

The flowmeter includes a round stainless steel pipe of the AISI 300 series whose wall has an inner surface of smoothness at least equal to a No. 4 mill finish and a vortex-shedding element of the aforementioned stainless steel series whose flow contact surfaces are as smooth as the aforementioned pipe wall inner surface. The vortex-shedding element is secured in the pipe wall in a unique manner. Two parallel co-planar sections each having an identically sized circular aperture of constant diameter are formed in the pipe wall. The vortex shedding element, which includes an elongate section having a flat front-member for producing spaced sets of vortices, is inserted through one of the apertures into the interior of the pipe and positioned so that the flat front-member is perpendicular to fluid flow. The elongate section further has a sensor-carrying bar-member for sensing the shed vortices. The bar-member is of predetermined cross-sectional area and extends downstream from the front-member and is rigidly connected thereto. The interfacing surfaces of the front-member and the bar-member form streamlined filleted junctions of low fluid collectability to ensure no entrapment of process fluid.

At each end of the vortex shedding element there is formed an enlarged disk shaped head having a flat outer surface and a flow contact surface that is flat in the region adjacent its perimeter. The perimeters of the outer and flow contact surfaces of each head are essentially congruent with the perimeters of the circular apertures. Furthermore, the thickness of the head is made constant and equal to the thickness of the co-planar sections of the pipe wall. The interfacing surfaces of the disk shaped heads and the elongate section form streamlined filleted junctions of low fluid collectability to ensure no entrapment of process fluid. Furthermore, each head is positioned so that the region of its flow contact surface adjacent its perimeter is co-planar with the inner surface of the corresponding co-planar pipe wall section. A total penetration autogeneous fusion weld formed by use of an electron beam bonds the side surface of each head to the side surface circumscribing the aperture in the corresponding co-planar pipe wall section. Because the co-planar feature of each aperture allows each electron beam weld to be made in a single plane, the resultant welds present flow contact surfaces that need only be minimally hand finished to insure a smoothness comparable to that of the adjoining surfaces.

Thus, all of the flow contact surfaces of the aforementioned flowmeter have low fluid collectability, thereby allowing no entrapment of process fluid anywhere.

DESCRIPTION OF THE PREFERRED EMBODIMENT

Figure 1:
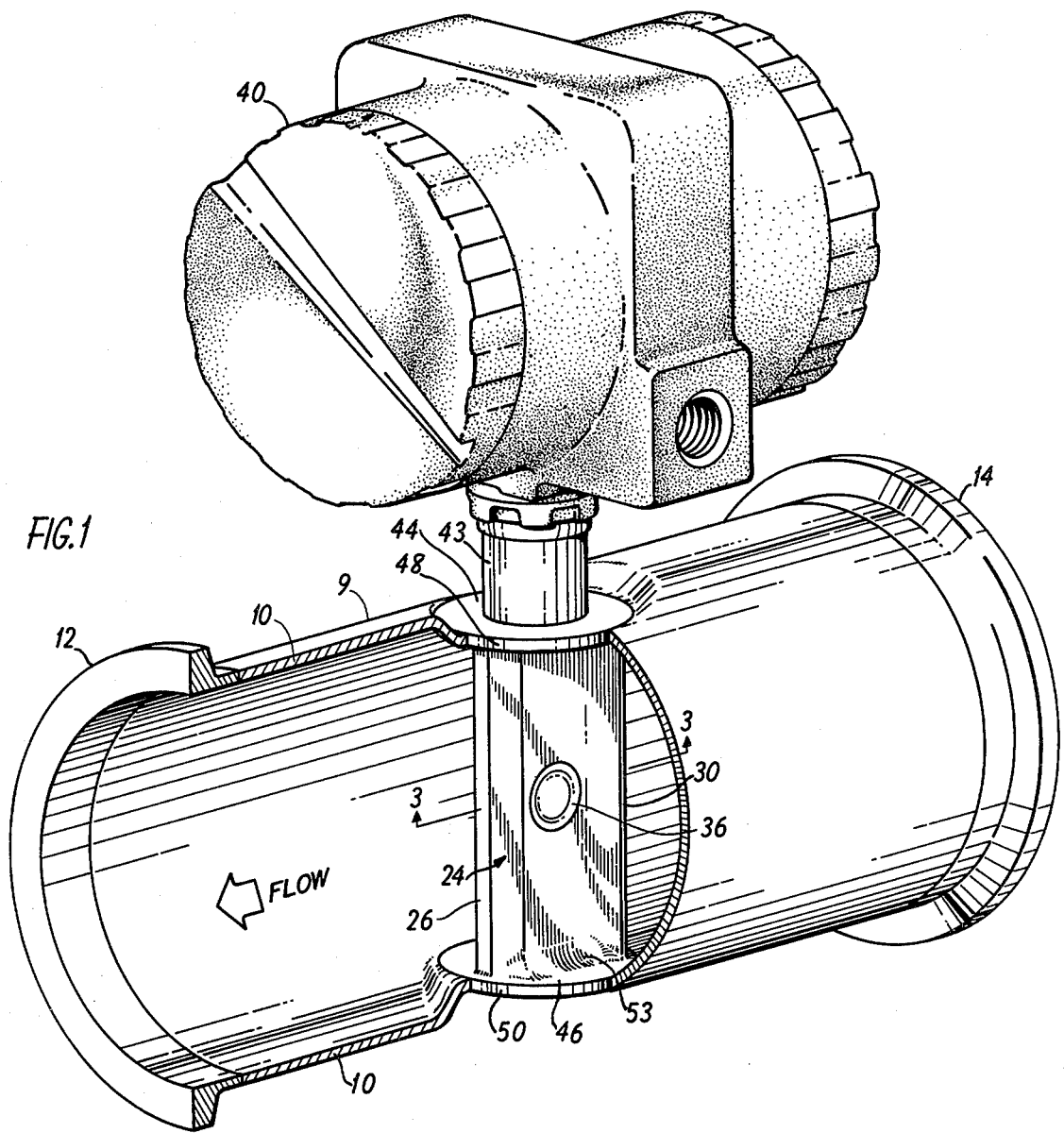
FIG. 1 is a detailed perspective view of the flowmeter with a cutout section exposing the vortex shedding element.

Referring now to FIG. 1, a flowmeter for use in sanitary applications which has flow contact surfaces of low fluid collectability to ensure no entrapment of process fluid is constructed in accordance with the principles of the present invention. To help achieve this low collectability characteristic, all inside angles in the flow contact surfaces are either greater than 135° or filleted with a radius of curvature of at least 0.25 inches. The flowmeter includes a round stainless steel pipe 9 of the AISI 300 series whose wall 10 has an inner surface of smoothness at least equal to a No. 4 mill finish. The pipe is adapted to be coupled by means of sanitary end flanges 12 and 14 into a sanitary pipe system (not shown).

Figure 3:
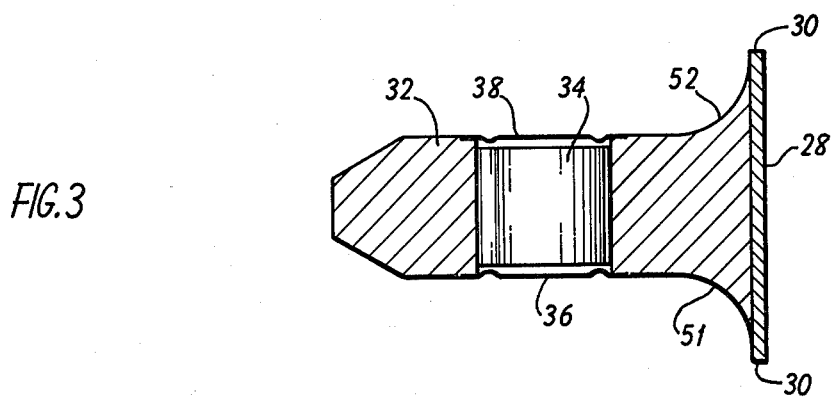
FIG. 3 is a horizontal section taken along line 3—3 to show the cross-section of the vortex shedding element in the region of the oil filled capsule.
Figure 2:
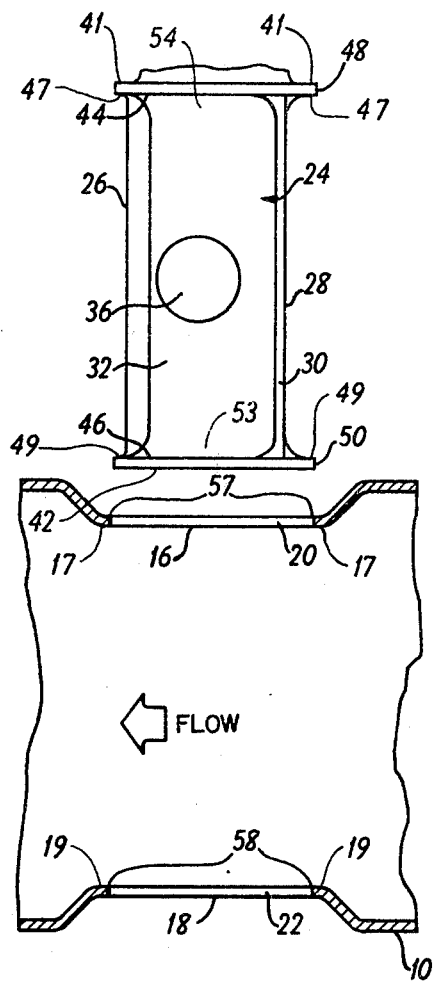
FIG. 2 is a side elevation view of the vortex shedding element shown removed from the pipe.

Turning now to FIG. 2 for more detail, two parallel co-planar sections 16 and 18 having identically sized constant diameter circular apertures 20 and 22 respectively, are formed in the pipe wall 10. A vortex shedding element 24 of the aforementioned stainless steel series whose flow contact surfaces are as smooth as the aforementioned pipe wall inner surface is secured in the wall in a unique manner. Referring now to FIG. 3, the vortex shedding element, which includes an elongate section 26 having a flat front member 28 for producing spaced sets of vortices along sharp lateral edges 30, is inserted through one of the apertures into the interior of the pipe and positioned so that the flat front member is perpendicular to the fluid flow. The elongate section further has a sensor carrying bar-member 32 for sensing the shed vortices. The bar-member is of predetermined cross-sectional area and extends downstream from the front member and is rigidly connected thereto. The interfacing surfaces of the front member and the bar-member form streamlined filleted junctions of low fluid collectability 51 and 52 to ensure no entrapment of process fluid. The sensor carrying bar-member 32 carries an oil filled capsule 34 having as side walls a pair of flexible stainless steel diaphragms 36 and 38 each positioned so as to sense the presence of one of the spaced sets of vortices. Details as to further construction of the oil filled capsule and nature of the sensor are found in U.S. Pat. No. 3,972,232, issued Aug. 3, 1976, whose disclosure is hereby incorporated by reference.

As shown in FIG. 1, an instrument housing 40 coupled by a support member 43 to the vortex shedding element 24 contains electronic circuitry for converting the frequency of production of the spaced sets of vortices into an analog signal representation of the flow rate. Details of this electronic circuitry are found in U.S. Pat. No. 3,978,098, issued Apr. 6, 1976, whose disclosure is hereby incorporated by reference.

Referring back to FIG. 2, at respective ends of the vortex shedding element 24 there are formed enlarged disks shaped heads 44 and 46 having respective flat outer surfaces 41 and 42 and respective flow contact surfaces 47 and 49 that are flat in the regions adjacent their perimeters. The outer surface 41 and the flow contact surface 47 along with the outer surface 42 and the flow contact surface 49 have perimeters that are essentially congruent with the perimeters of the circular apertures 20 and 22 respectively. Furthermore, the thickness of the heads 44 and 46 is made constant and equal to the thickness of the co-planar sections 16 and 18, respectively, of the pipe wall 10. The interfacing surfaces of the disk shaped heads and the elongate section 26 form streamlined filleted junctions of low fluid collectability 53 and 54 to ensure no entrapping of process fluid. Furthermore, the heads 44 and 46 are positioned so that the regions of flow contact surfaces 47 and 49 adjacent their perimeters are co-planar with inner surfaces 17 and 19, respectively, of co-planar pipe wall sections 16 and 18.

Figure 4:
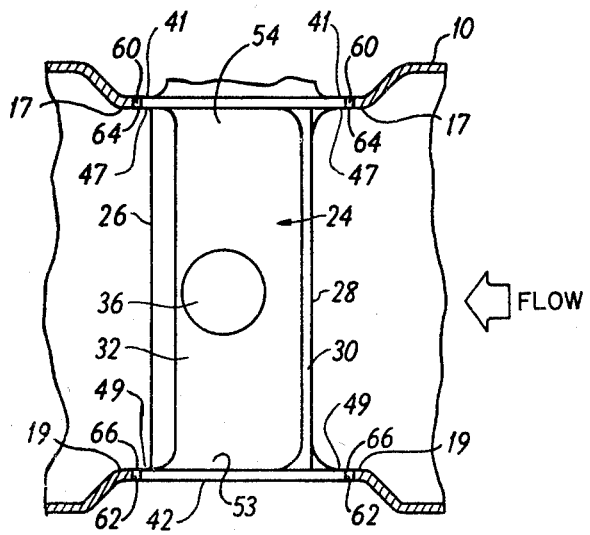
FIG. 4 is a side elevation view of the vortex shedding element welded to the pipe wall side surfaces circumscribing the respective apertures.

Referring now to FIG. 4, total penetration autogeneous fusion welds 60 and 62 formed by use of an electron beam bond head side surfaces 48 and 50 (FIG. 2) to respective side surfaces 57 and 58 (FIG. 2) circumscribing apertures 20 and 22. Because the co-planar feature of each of the apertures 20 and 22 allows each of the electron beam fusion welds 60 and 62 to be made in a single plane, the resultant welds 60 and 62 have respective flow contact surfaces 64 and 66 that need only be minimally hand finished to insure a smoothness comparable to that of the flow contact surfaces adjoining the welds.

Thus, all of the flow contact surfaces of the aforementioned flowmeter have low fluid collectability, thereby allowing no entrapment of process fluid anywhere.

Many changes and modifications in the above described embodiment of the present invention may of course be carried out without departing from the scope thereof. Accordingly the scope is intended to be limited only in the scope of the appended claims.

What is claimed is:

1. A flowmeter of the flow obstruction type for use in sanitary applications comprising:
   a pipe for carrying a flowing fluid, said pipe having a wall with a curved surface, said curved surface having at least one flatened section, said flatened section having inner and outer surfaces and containing an aperture;
   a flow obstruction element;
   means for mounting said flow obstruction element in the interior of said pipe;
   said flow obstruction element having an elongate section providing a partial flow obstruction for measuring flow rate through said pipe;
   said flow obstruction element further having an enlarged head at one end; p1 said head having a flow contact surface of low fluid collectability which is co-planar with said inner surface of said flatened section at least in the region of the perimeter of said flow contact surface;
   said head having a side surface;
   means for bonding said head side surface to the pipe wall side surface circumscribing said aperture;
   said flow obstruction element, said pipe wall and said bonding means presenting surfaces accessible to said fluid that have low fluid collectability, thereby preventing entrapment of said fluid.

2. A flowmeter as in claim 1 further including:
   a second flatened section in said pipe wall said second flatened section having inner and outer surfaces and containing an aperture;
   said flow obstruction element having a second enlarged head at the opposite end;
   said second head having a flow contact surface of low fluid collectability which is co-planar with said inner surface of said second flatened section at least in the region of the perimeter of said flow contact surface of said second head;
   said second head having a side surface;
   means for bonding said second head side surface to the pipe wall side surface circumscribing said aperture in said second flatened section.

3. A flowmeter as in claim 2 wherein said pipe is round.

4. A flowmeter as in claim 3 wherein said flatened section and said second flatened section are parallel.

5. A flowmeter as in claim 4 wherein said flow obstruction element is a vortex-shedding element, the apertures are circular and the enlarged heads are disk shaped.

6. A flowmeter as in claim 5 wherein said bonding means and said second bonding means are total penetration autogeneous fusion welds.

7. A flowmeter as in claim 6 wherein said welds are formed by use of an electron beam.

8. A flowmeter as in claim 1 wherein said pipe is round.

* * * * *